United States Patent [19]
Byung-Do et al.

[11] Patent Number: 4,741,566
[45] Date of Patent: May 3, 1988

[54] DOG EXCREMENT CLEANER

[76] Inventors: Im Byung-Do, 3038 Bainbridge Ave., Bronx, N.Y. 10467; George Spector, 233 Broadway, Rm 3815, New York, N.Y. 10007

[21] Appl. No.: 918,785
[22] Filed: Oct. 14, 1986
[51] Int. Cl.⁴ ............................................. A01K 29/00
[52] U.S. Cl. ...................... 294/1.4; 15/104.8; 15/257.3; 15/257.6; 294/55
[58] Field of Search .................... 294/1.3–1.5, 294/55; 15/104.8, 257.1–257.7

[56] References Cited
U.S. PATENT DOCUMENTS

| 3,002,209 | 10/1961 | McKinstry | 15/257.1 X |
| 3,431,008 | 3/1969 | Narita | 294/1.4 |
| 3,781,940 | 1/1974 | Lehrer | 15/104.8 |
| 4,042,269 | 8/1977 | Skermetta | 294/1.5 |
| 4,119,337 | 10/1978 | Sherhandt | 294/1.4 |
| 4,225,174 | 9/1980 | Hennessy et al. | 294/1.4 |
| 4,368,907 | 1/1983 | Ross | 294/1.4 |

FOREIGN PATENT DOCUMENTS

| 2604420 | 8/1977 | Fed. Rep. of Germany | 294/1.4 |
| 318269 | 7/1934 | Italy | 15/257.7 |
| 633849 | 2/1962 | Italy | 15/104.8 |
| 448823 | 6/1936 | United Kingdom | 15/104.8 |

Primary Examiner—Johnny D. Cherry

[57] ABSTRACT

An apparatus for removing animal feces is provided that will conveniently collect and enclose feces into a receptacle wherein an improved scraping device is provided which opens outward of the receptacle in response to squeezing a trigger handle and which automatically in a scraping motion moves and encloses feces in the receptacle. In a modified form cleaning fluid is provided for flushing the apparatus.

2 Claims, 2 Drawing Sheets

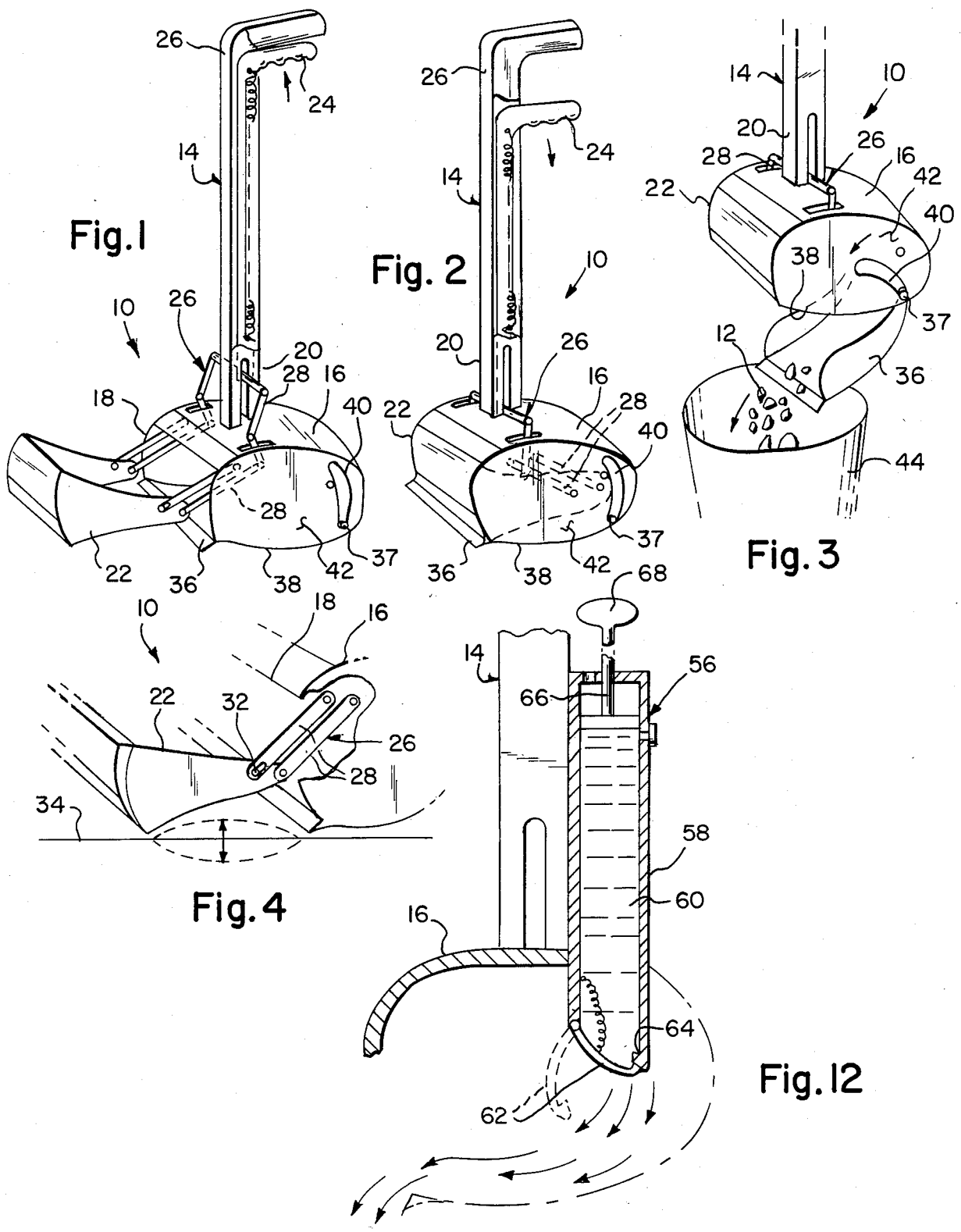

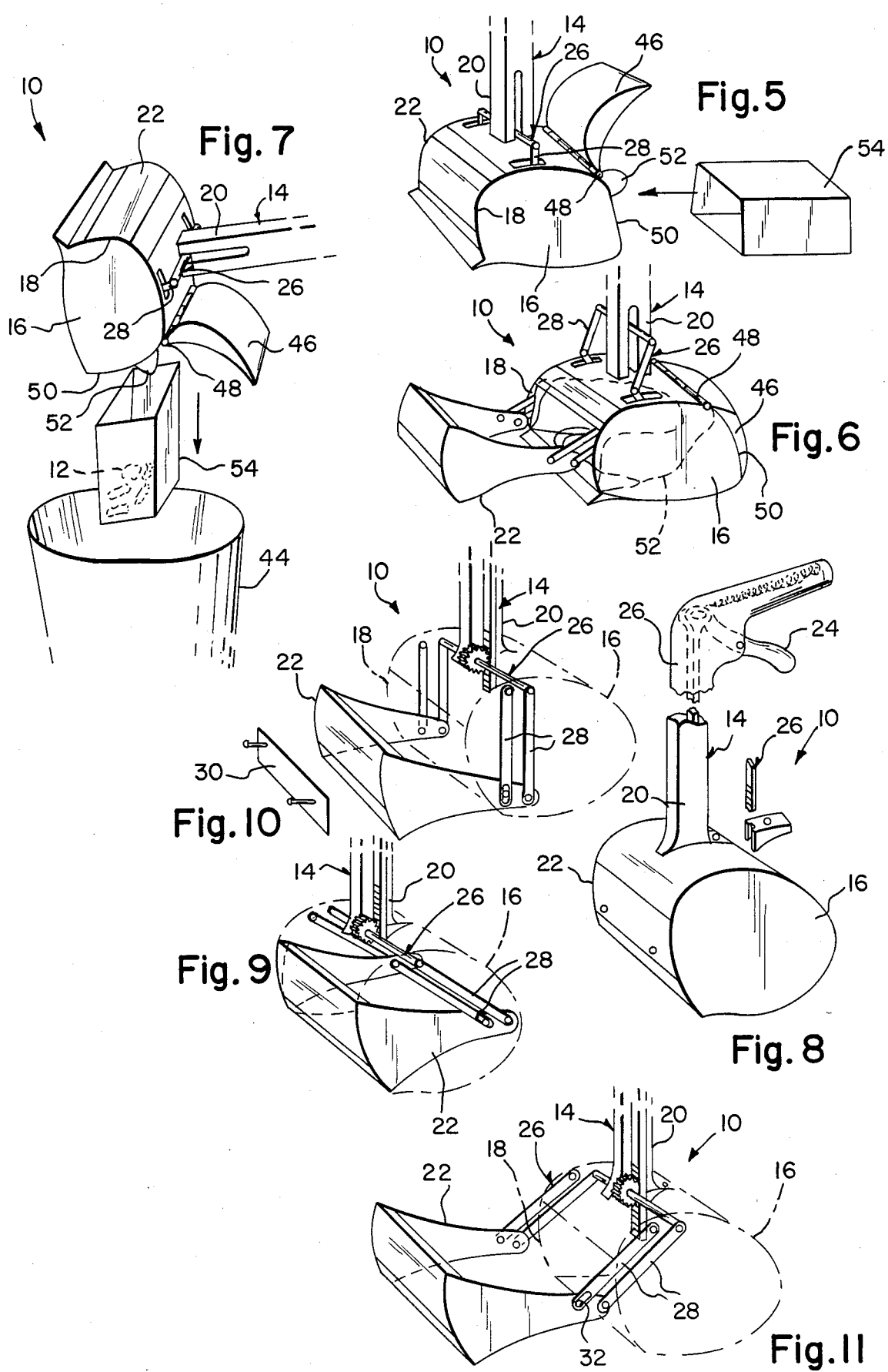

DOG EXCREMENT CLEANER

BACKGROUND OF THE INVENTION

The instant invention relates generally to collecting devices and more specifically it relates to an apparatus for removing animal feces.

Numerous collecting devices have been provided in the prior art that are adapted to pick up droppings of dogs, cats and the like. For example, U.S. Pat. Nos. 4,148,513; 4,200,321 and 4,225,174 all are illustrative of such prior art. While these units may be suitable for the particular purpose to which they address, they would not be as suitable for the purposes of the present invention as heretofore described.

SUMMARY OF THE INVENTION

A primary object of the present invention is to provide an apparatus for removing animal feces that will overcome the shortcomings of the prior art devices.

Another object is to provide an apparatus for removing animal feces that will scrape and collect the feces into a receptacle without exposing the previous feces in the receptacle that was picked up before.

An additional object is to provide an apparatus for removing animal feces that will normally keep the receptacle closed so as not to expose the feces within the receptacle until the apparatus is carried to a trash can and activated to an open position for disposing the feces.

A further object is to provide an apparatus for removing animal feces that is simple and easy to use.

A still further object is to provide an apparatus for removing animal feces that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the first embodiment of the invention in an open position.

FIG. 2 is a perspective view similar to FIG. 1 in a closed position.

FIG. 3 is a perspective view showing animal feces being dumped into a trash can.

FIG. 4 is a partial perspective view thereof showing the scraper adapted to all kinds of surfaces.

FIG. 5 is a perspective view of the second embodiment being loaded with a paper bag.

FIG. 6 is a perspective view showing the second embodiment in an open position.

FIG. 7 is a perspective view thereof showing the bag with animal feces being dumped into a trash can.

FIG. 8 is a perspective view of a third embodiment with parts broken away in a closed position.

FIG. 9 is a perspective view similar to FIG. 8 showing the receptacle in phantom so that the internal structure can be seen.

FIG. 10 is a perspective view similar to FIG. 9 in a partially open position.

FIG. 11 is a perspective view similar to FIG. 10 in a completely open position.

FIG. 12 is a cross sectional view of a flushing device mounted behind the handle and extending into the receptacle so as to wash out the receptacle after animal feces are dumped out therefrom.

DETAILED DESCRIPTION OF THE PREFERRED EMBODIMENTS

Turn now descriptively to the drawings, in which similar reference characters denote similar elements throughout the several views, the figures illustrate an apparatus 10 for removing animal feces 12 and consists of a longitudinal handle 14 and a receptacle 16 that has an open end 18. The receptacle 16 is attached to lower end 20 of the handle 14. A scraper 22 is placed across the open end 18 of the receptacle 16. A spring biased trigger 24 is attached to upper end 26 of the handle 14.

A structure 26 is provided for connecting the scraper 22 to the spring biased trigger 24. When the trigger 24 is squeezed the scraper 22 will move away from the open end 18 of the receptacle 16. When the trigger 24 is released the scraper 22 will move towards the open end 18 of the receptacle 16 for sliding the animal feces 12 into the receptacle.

The structure 26 includes a plurality of pivotable linkage members 28 within the receptacle 16 extending between the scraper 22 and the trigger 24. The scraper 22 has a removable blade 30 (see FIG. 10) so as to be replaceable when worn out. Some of the linkage members 28 that are connected to the scraper 22 are adjustably pivoted thereto at 32 (see FIG. 4) so that the scraper can be adapted to all kinds of surfaces 34 that contain the animal feces 12.

The apparatus 10 can contain a spring biased trap door 36, as shown in FIGS. 1 through 3, which is pivotally mounted at 37 to underside 38 of the receptacle 16 whereby the trap door 36 is normally closed against the receptacle 16. An activator lever 40 is connected at 37 to the trap door 36 at side 42 of the receptacle 16. The lever 40 can be manually operated to open the trap door 36 for removal of the animal feces 12 into a trash can 44.

As shown in FIGS. 5, 6 and 7 the apparatus 10 can contain a spring biased trap door 46 pivotally mounted at 48 to back end 50 of the receptacle 16 opposite the open end 18 thereof, whereby the trap door 46 is normally closed against the receptacle 16. A frame member 52 is mounted within the receptacle. A paper bag 54 is inserted into the back end 50 of the receptacle 16 over the frame member 52 when the trap door 46 is manually opened in which the paper bag 54 will receive the animal feces 12 for easy disposal into a trash can 44.

FIG. 12 shows a flushing device 56 mounted behind the handle 14 and extends into the receptacle 16 so as to wash out the receptacle after the animal feces 12 are dumped out therefrom. The device 56 includes a container 58 for holding soapy water 60. A spring biased curved flap valve 62 is normally closed against a stop seal 64 and will open to discharge the water 60 when a piston 66 with handle 68 is pressed into the container 58.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An apparatus for removing animal feces from a surface comprising:
   (a) a longitudinal handle;
   (b) a receptacle having an open end, said receptacle attached to the lower end of said handle;
   (c) a scraper normally in a closed position across said open end of said receptacle and moveable outward to an open position;
   (d) a spring biased trigger attached to the upper end of said handle;
   (e) means for connecting said scraper to said spring biased trigger whereby when said trigger is squeezed said scraper will move away from said open end of said receptacle to said open position and when said trigger is released said scraper will move towards said open end of said receptacle scraping said surface and sliding said animal feces into said receptacle in returning to said closed position wherein said means comprise parallel sets of links having a transverse connective link secured to said trigger and guided vertically through a slot in said handle.

2. An apparatus for removing animal feces from a surface comprising:
   (a) a longitudinal handle;
   (b) a receptacle having an open end, said receptacle attached to the lower end of said handle;
   (c) a scraper normally in a closed position across said open end of said receptacle and moveable outward to an open position;
   (d) a spring biased trigger attached to the upper end of said handle;
   (e) means for connecting said scraper to said spring biased trigger whereby when said trigger is squeezed said scraper will move away from said open end of said receptacle to said open position and when said trigger is released said scraper will move towards said open end of said receptacle scraping said surface and sliding said animal feces into said receptacle in returning to said closed position, further comprising a flushing device mounted adjacent said handle and extending into said receptacle including a cylinder with a spring closed valve which is moveable to an open position communicating with said receptacle including a manually operated piston for increasing pressure in said cylinder to open said valve.

* * * * *